US006859993B2

(12) United States Patent
Nutter

(10) Patent No.: US 6,859,993 B2
(45) Date of Patent: Mar. 1, 2005

(54) METHOD OF MAKING SINGLE PHASE PERMANENT SPLIT CAPACITOR MOTOR

(75) Inventor: Robert G. Nutter, Fort Wayne, IN (US)

(73) Assignee: Electric Motors and Specialties, Inc., Garrett, IN (US)

( * ) Notice: Subject to any disclaimer, the term of this patent is extended or adjusted under 35 U.S.C. 154(b) by 0 days.

(21) Appl. No.: 10/342,554

(22) Filed: Jan. 15, 2003

(65) Prior Publication Data
US 2004/0135456 A1 Jul. 15, 2004

(51) Int. Cl.[7] .................. H02K 15/02; H02K 15/10
(52) U.S. Cl. .................. 29/598; 29/596; 29/605; 29/606; 29/609; 310/89; 310/172; 318/254; 318/751
(58) Field of Search .................. 29/598, 596, 605, 29/606, 609; 310/89, 172; 318/254, 751

(56) References Cited

U.S. PATENT DOCUMENTS

| 3,158,769 A | * | 11/1964 | Morrill | .................. 310/172 |
| 4,649,305 A | * | 3/1987 | Morrill | .................. 310/72 |
| 6,175,208 B1 | * | 1/2001 | Rose | .................. 318/751 |

* cited by examiner

Primary Examiner—Carl J. Arbes
Assistant Examiner—Tim Phan
(74) Attorney, Agent, or Firm—Pearne & Gordon LLP

(57) ABSTRACT

A permanent split capacitor electric motor is constructed by using existing components of a known shaded pole motor design to reduce engineering, tooling, inventory and other manufacturing costs of the new motor and, potentially, the known design through economics of scale. The alterations to the known motor principally involve different winding circuits and the addition of a capacitor. The new motor can be reversed with a single switch circuit.

9 Claims, 3 Drawing Sheets

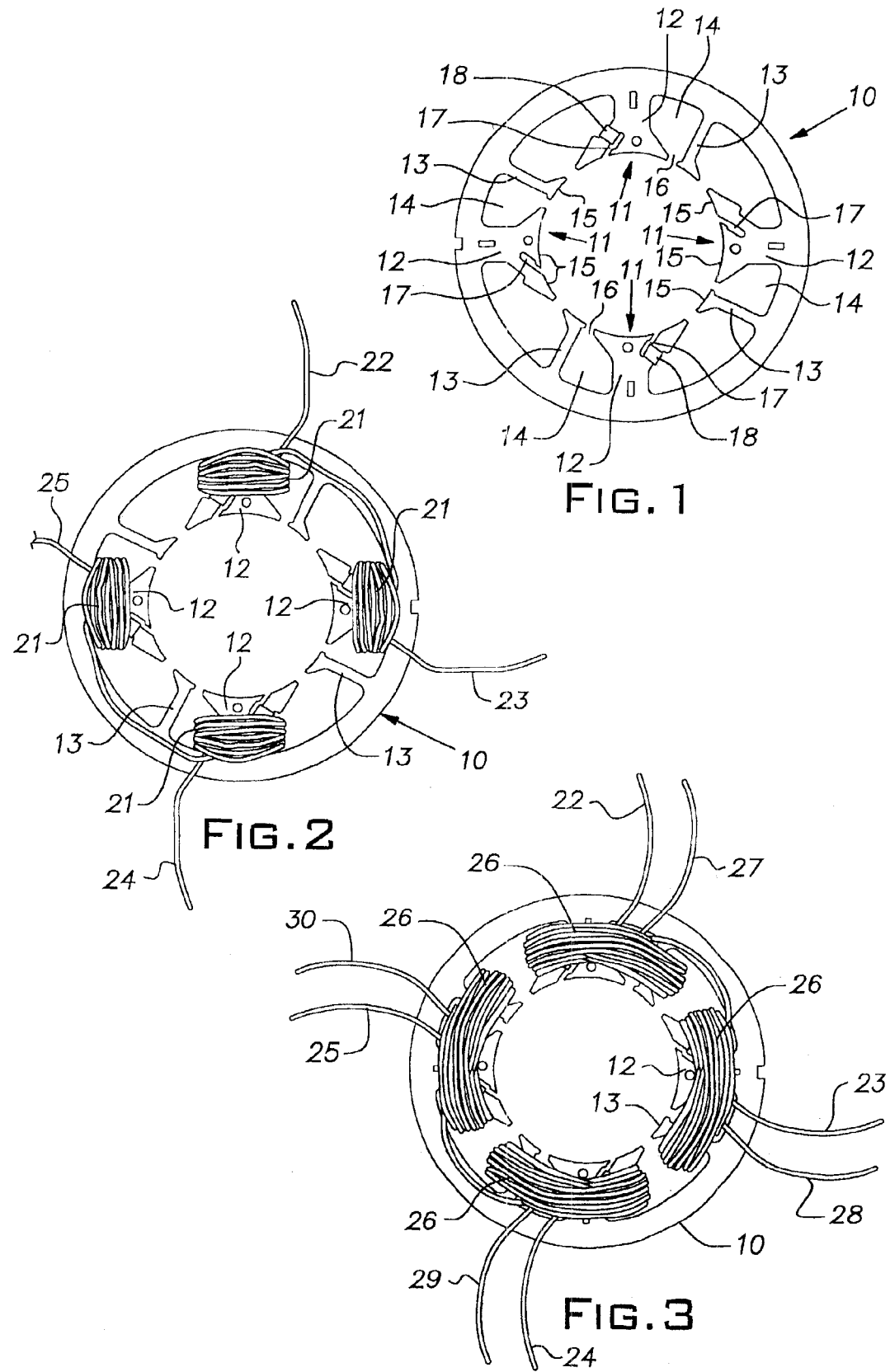

METHOD OF MAKING SINGLE PHASE PERMANENT SPLIT CAPACITOR MOTOR

BACKGROUND OF THE INVENTION

The invention relates to improvements in fractional horsepower electric motor constructions.

PRIOR ART

Shaded pole electric motors are well known for their simplicity and low manufacturing costs. These attributes allow manufacturers to sell relatively high volumes of these types of motors. U.S. Pat. No. 3,158,769 discloses an efficient design for a shaded pole motor.

The cost of new tooling can make the difference in whether or not it is economically practical for a manufacturer to offer a new line of motors. Where initial tooling costs are minimized or largely avoided, a manufacturer can more readily introduce a new product line while avoiding significant financial risks, prolonged development time and consumption of other resources, including labor and allocations to inventory.

There exists a need for a reversible fractional horsepower motor of proven durability that can be used, for example, in the air circulation path of refrigeration units.

SUMMARY OF THE INVENTION

The invention involves a discovery that a class of shaded pole motors have most of their componentry usable, without modification, to construct a permanent split capacitor motor. The resulting permanent split capacitor motor, compared to an ordinary shaded pole motor can be more efficient and have a higher starting torque as well as being reversible.

More specifically, in accordance with the invention, a type of shaded pole motor having its poles slotted, apart from the shading coil slots, can be wound with separate field coils that correspond in function to the main and auxiliary windings of a conventional permanent split capacitor motor. The invention, thus, enables a manufacturer to produce a permanent split capacitor motor while avoiding major investments in new tooling and additional inventory of component parts dedicated solely to the production of such a motor. Additionally, a motor manufacturer can realize a savings in costs where an increased volume of component parts applicable to both the shaded pole and permanent split capacitor motor can reduce the individual costs of these components.

BRIEF DESCRIPTION OF THE DRAWINGS

FIG. 1 is an axial view of an exemplary stator, formed of a stack of laminations, used in the present invention;

FIG. 2 is a view similar to FIG. 1 of the stator wound with inner coils at its poles;

FIG. 3 is a view similar to FIGS. 1 and 2 of the stator wound with inner and outer coils at its poles;

DESCRIPTION OF THE PREFERRED EMBODIMENT

Figure 4:
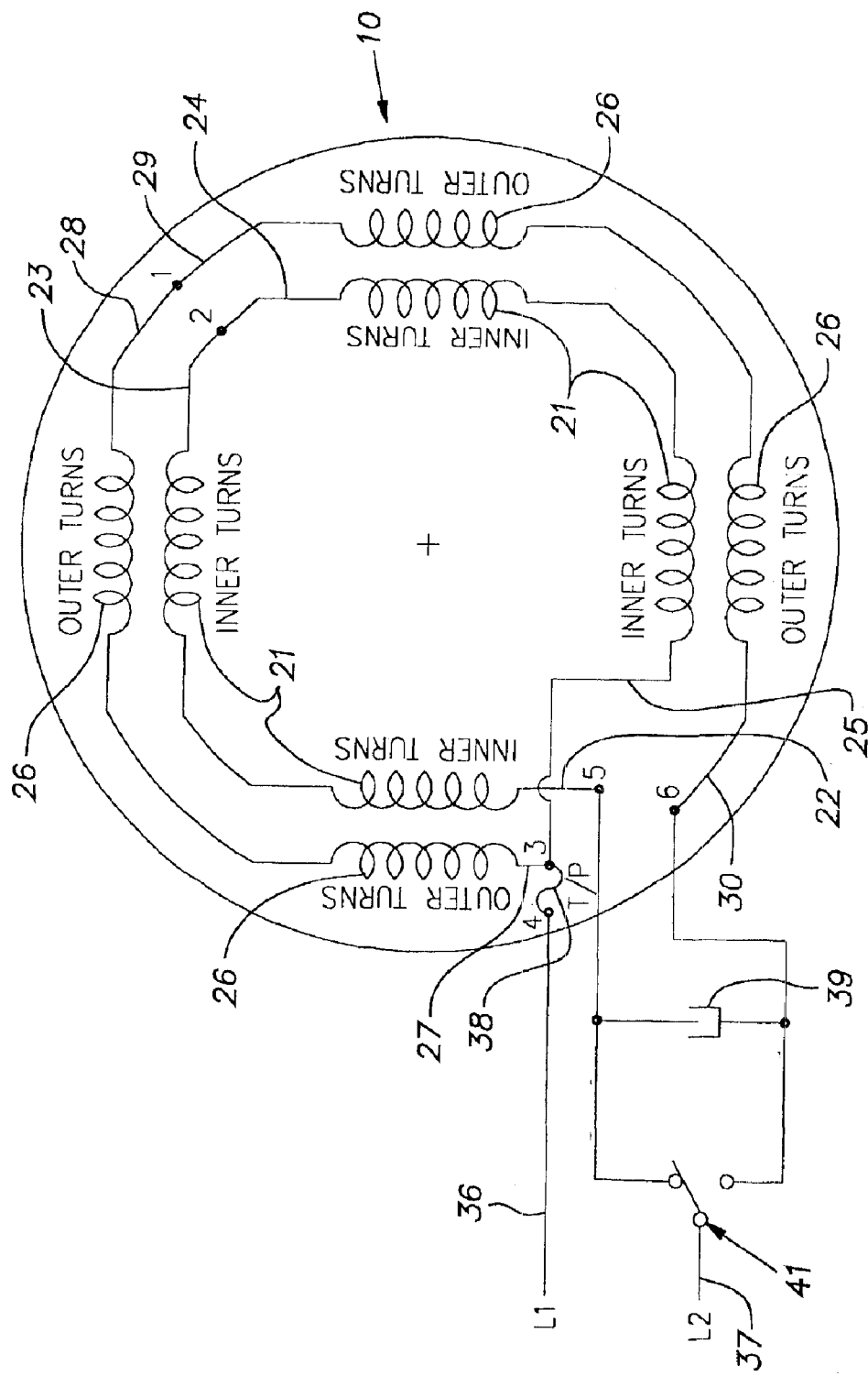
FIG. 4 is a schematic electrical diagram representing a circuit used with the motor of the invention.

Referring now to the drawings, FIG. 1 illustrates a stack of stator laminations 10 similar to that illustrated in aforementioned U.S. Pat. No. 3,158,769, the disclosure of which is incorporated herein by reference. The stack of stator laminations 10 form four salient poles 11. Each of the poles 11 has a first or main portion 12 and a second or minor portion 13. The pole portions 12, 13, are separated by a large slotted opening 14 communicating with a face 16 of the pole 11. Each first or main pole portion 12 has a slot 17 as is customarily found in shaded pole stators. Two diametrically opposed slots 17, in the illustrated example, receive a self-shorted shading coil 18 in a known manner.

As taught in the aforementioned '769 patent, at each pole motor the main pole portion 12 and then the main and minor pole portions 12, 13 together, are wound with coils in a series circuit to form the field coils of a shaded pole motor.

In contrast, in accordance with the present invention, at each pole 11, the pole portions are wound with coils that are electrically independent of one another. More specifically, a first field coil or winding 21 is wound on a main portion 12. As suggested in FIG. 2, adjacent sets of the pole portions 12 can be wound with a single continuous length of magnet wire. Leads from these coils are identified by the numerals 22–25.

A second field coil or winding 26 is wound on both the major and minor pole portions 12, 13 at each pole 11 as shown in FIG. 3. As with the coils 21, adjacent sets of the coils 26 can be wound from a single continuous length of magnet wire. The leads from the four field coils 26 are identified by the numerals 27–30.

Figure 5:
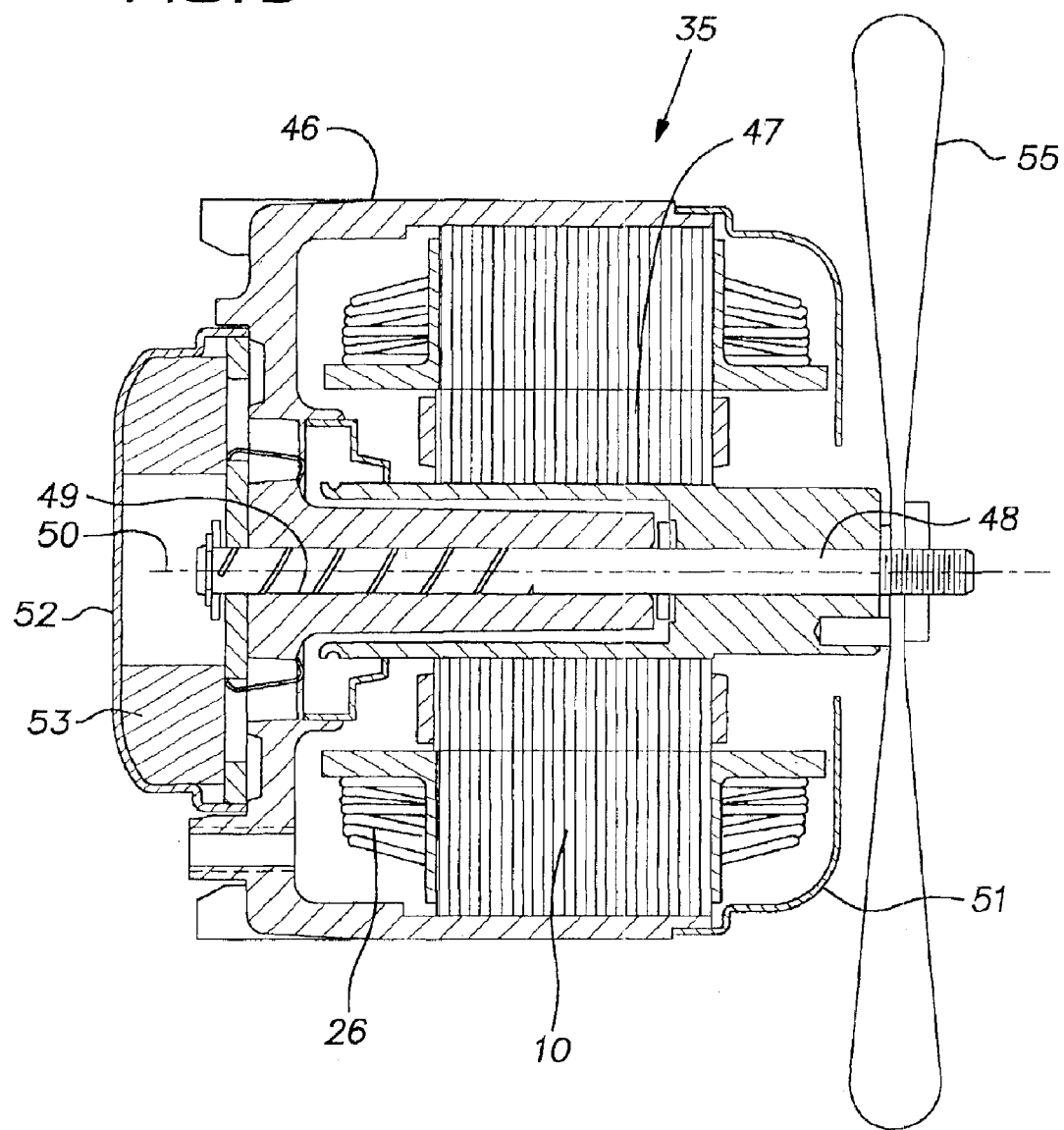
FIG. 5 is a longitudinal cross-sectional view of a motor constructed in accordance with the invention and using the wound stator of FIG. 3.

FIG. 5 illustrates the stator laminations 10 and the field windings or coils 21, 26 in assembled relation with other parts of a permanent split capacitor motor 35. FIG. 4 is a schematic representation of the circuitry in which the stator field windings 21, 26 are arranged. The coils 21 on the main pole portions 12 are connected in series with each other and, similarly, the coils 26 wound on the first and second pole portions 12, 13 are connected in series with one another. Single phase power, e.g. 115 VAC power is supplied across lines 36, 37 to the motor 35. The serially arranged windings 21, 26 are connected together at one side at leads 25 and 27 and through a thermal protector 38 to a common line 36. A capacitor 39, typically mounted on the exterior of the motor 35, as is conventional with standard permanent split capacitor motors, is connected across the other leads coming from the windings 21, 26, respectively. A reversing switch 41 in the form of a single pole double throw unit is connected to the leads 22 and 30 of the windings 21, 26. The switch 41 is thereby enabled to selectively supply line power directly to the main winding lead 30 or the auxiliary winding lead 22 depending on its position. The winding 21 or 26 not directly connected to the switch 41 is energized through the capacitor 39.

The function of the capacitor 39 is to cause the field winding 21 or 26 to which the pole of the switch 41 is not directly connected with the supply power at the line 37 to lead in phase the current and magnetic field development of the other winding coil. Under normal or forward operation of the motor 35 a squirrel cage rotor will turn counterclockwise in the view of FIG. 3. This results from a shift in the magnetic field at each pole 11 from a point where it is centered approximately with the center of the coil 26 wound about both the first and second pole portions 12, 13 since in this normal or forward operation the capacitor 39 is connected to this winding. The coil 21 on the minor pole portion 14 subsequently reaches its maximum field strength (after the coil 26 reaches its maximum field strength). The squirrel cage rotor is caused to rotate to follow this shift in effective magnetic field position. Still further, the shaded pole portions associated with the shading coils 18 subsequently reach their maximum magnetic field strength thereby inducing further movement of the squirrel cage rotor in the counterclockwise direction, with reference to FIG. 3.

As suggested above, the motor can be reversed by changing the position of the switch 41 so that it connects line power directly to the coils 21 and the other field coils 26 are connected through the capacitor 39. A study of FIGS. 2 and 3, again, will reveal that in this case, the coils 21 first come to a maximum field strength and, thereafter, the coils 26 reach their maximum field strength. This action results in clockwise rotation of the rotor as it would be viewed in FIG. 3.

It is well understood that a shaded pole motor is unidirectional and that the rotor will always turn from the part of a pole that is unshaded to the shaded part of a pole since the shaded pole port reaches its maximum field strength last and, therefore, the field turns from the unshaded portion to the shaded portion.

FIG. 5 illustrates an example of a motor 35 that benefits from the present invention. The motor 35 includes a housing 46 in which the stator 10 is received. A squirrel cage rotor assembly 47 is disposed in the bore of the stator 10 formed by the faces 15 of the poles 11. The rotor assembly 47 is supported on a shaft 48 journalled in a bore 49 formed in the housing 46. The rotor axis is indicated at 50. A load on the motor 35 is represented by an axial fan diagramatically shown at 55 on the shaft 48. The housing 46, rotor assembly 47, stator laminations 10 as well as the smaller components such as front and rear covers 51, 52, felt oil reservoir 53 and various clips, washers and like accessories are typically used in a shaded pole motor such as disclosed in aforementioned U.S. Pat. No. 3,158,769.

As discussed, in accordance with the present invention, the same component parts used to construct a shaded pole motor can be used to produce a permanent split capacitor motor. For the most part, the only changes required to convert from the shaded pole motor to the permanent split capacitor motor are different windings on the stator laminations 10 and the addition of a capacitor 39 in a manner like that taught hereinabove. The rotor assembly can be modified to reduce the end ring cross-section to improve starting torque in the permanent split capacitor motor. It has been found that at least in one version of a motor constructed in accordance with the invention that the provision of two shaded pole portions provide a proper balance of efficiency in normal operation in one direction and adequate torque in reverse operation. Where reversibility is not needed, all of the poles of the motor can be provided with a shading coil and greater starting torque and efficiency can be expected. At least in certain instances, the provision of four shading coils makes reversible operation too inefficient to be practical. In some instances, the shading coils 18 can be omitted from all of the slots 17.

The disclosed motor is useful in refrigeration cabinets for air circulation where it is desirable to reverse the air flow produced by the fan during a defrost cycle.

It will be understood that the principles of the invention are applicable to other styles of motors including two and six pole motors, for example.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A method of making a single phase permanent split capacitor motor comprising utilizing a stator having an even number of salient poles, the poles each being divided into two portions and having a configuration usable in the regular manufacture of shaded pole motors, at each pole winding a first coil about one of said portions and subsequently winding a second coil about both of said portions, electrically connecting all of the first coils together in a first winding set and all of the second coils together in a second winding set, electrically connecting a capacitor between the first and second winding sets, arranging the leads from the first and second winding sets to enable single phase AC line power to be applied to both winding sets, one of said winding sets being connected to a side of the line power through a capacitor while the other of said winding sets is connected to said one side independently of said capacitor.

2. A method as set forth in claim 1, wherein said poles are arranged to receive a shaded coil.

3. A method as set forth in claim 2, wherein at least some of said poles are arranged with a shading coil.

4. A method as set forth in claim 1, wherein a switch is provided to reverse the relationship of said sets of windings with respect to said capacitor and the one power line to enable the motor to reverse direction.

5. A method as set forth in claim 4, wherein the motor is provided with a squirrel cage rotor and a fan is attached to the rotor whereby upon reversal of the motor direction the direction of air flow through the fan is reversed.

6. A method as set forth in claim 1, wherein the stator is formed of laminations that are drawn from inventory used to make shaded pole motors.

7. A method as set forth in claim 1, wherein the rotor is formed with laminations drawn from inventory used to make shaded pole motors.

8. A method as set forth in claim 1, wherein the motor is provided with a housing drawn from inventory used to make shaded pole motors.

9. A method as set forth in claim 1, wherein the rotor is constructed of laminations drawn from inventory used to make shaded pole motors, the stator is assembled from laminations drawn from inventory used to make shaded pole motors, and the motor is provided with a housing drawn from inventory used to make shaded pole motors.

* * * * *